United States Patent [19]

Wakabayashi et al.

[11] 4,016,305

[45] Apr. 5, 1977

[54] VACUUM DEPOSITION METHOD

[75] Inventors: Yukimasa Wakabayashi, Toda; Shigeru Takahashi, Tokyo, both of Japan

[73] Assignee: Fujikura Kasei Co., Ltd., Tokyo, Japan

[22] Filed: Aug. 12, 1975

[21] Appl. No.: 604,044

[30] Foreign Application Priority Data

Aug. 16, 1974 Japan .............................. 49-93208

[52] U.S. Cl. .............................. 427/42; 204/192 R; 427/50; 427/250; 427/294; 427/296
[51] Int. Cl.² .................... B05D 1/38; C23C 13/02; C23C 13/04
[58] Field of Search .............. 427/248, 250, 38, 42, 427/50, 126, 124, 294, 296; 204/192 R, 192 C

[56] References Cited

UNITED STATES PATENTS

| | | | |
|---|---|---|---|
| 3,677,792 | 7/1972 | Best | 427/248 |
| 3,740,254 | 6/1973 | Lansbury et al. | 427/250 |

*Primary Examiner*—James R. Hoffman
*Attorney, Agent, or Firm*—Wenderoth, Lind & Ponack

[57] ABSTRACT

A method for vacuum deposition which comprises coating on the surface of a substrate to be metallized an undercoating composition comprising a hydroxyl-containing vinyl polymer havng a hydroxyl number of 20 to 200 and 1.1 to 5.0 equivalents, per equivalent of the hydroxyl group in the vinyl polymer, of a polyisocyanate as a film-forming component, curing the coated film, and depositing a metal or its compound, especially highly anticorrosive metal or its compound, on the undercoat in vacuum.

18 Claims, No Drawings

VACUUM DEPOSITION METHOD

This invention relates to a vacuum deposition method, and more specifically, to an improved vacuum deposition method effective for forming films of various metals, metal compounds or alloys, especially highly corrosion-resistant nickel and chromium, their compounds or alloys, on the surface of a substrate such as plastics, glass or ceramics.

The vacuum deposition method comprising evaporating or gasifying a metal or its alloy or compound, and condensing the resulting vapor on the surface of a substrate under vacuum to form a film of the metal on it has found widespread acceptance for rendering non-conductive substances such as plastics, glass or ceramics conductive in the field of electronics, and for increasing the decorative effects of various shaped component parts or articles in the fields of automobiles, electric machinery and appliances, and household sundries.

In a general procedure of vacuum deposition for increasing the decorative effect, it has been common practice to coat a resin solution on the surface of a substrate such as a plastic shaped article as a "base coat" for the purposes, of imparting a firm adhesion of the deposited film to the substrate surface, to smoothing the surface of the substrate to obtain a superior mirror surface and to prevent the gassy phenomenon whereby a volatile substance contained in the substrate volatilizes off in vacuum. The coating is then dried and cured and metallic aluminim is heated in an evaporation kettle maintained at a vacuum of about $10^{-3}$ to $10^{-5}$ mmHg to evaporate it to allow the aluminum vapor to condense on the base coat layer of the surface of the substrate in such a manner as to form an aluminum film layer having a thickness of about 200 to 5,000 A. The aluminum layer is then top-coated with a resin solution and dried it in order to protect the aluminum film layer.

Shaped articles having an aluminum film layer vacuum-deposited in this manner have been used in a very wide range of fields, for example, as casing or knobs for television and radio sets and other acoustical devices, guard marks of electric fans, time-indicating face plates of clocks and watches, caps of decorative bottles, or instrument panels of automobiles.

In particular, methods for metallizing plastic articles by the vacuum deposition method have found an increasingly wider range of applications because these methods are simple in process steps as compared with the method for metallizing plastic articles by electroless or electric plating, and treatment of waste liquids as in plating is not required at all. Such a diversity of applications has naturally given a strong incentive to the development of metal-deposited plastic shaped articles having improved properties such as durability.

However, almost all metals used in the conventional vacuum deposition methods are aluminum. Aluminum is an amphoteric metal, and has poor chemical resistance, especially to acids and alkalies. When shaped plastic articles having an aluminum film vacuum-deposited thereon are used in a corrosive atmosphere, for example, outdoors, the deposited film is corroded within a very short period of time, and defects such as reduction or disappearance of metallic luster or disappearance of the metal itself by corrosion result. These defects are vary difficult to completely remedy through use of by using any of the known topcoats as a protective layer.

The defect of poor corrosion resistance could theoretically be eliminated by vacuum-depositing a highly corrosion-resistant metal such as chromium or nickel instead of the aluminum. Accordingly, various attempts have been made so far to vacuum-deposit an anti-corrosive metal such as chromium or nickel or their alloy on the surface of a shaped article. The conventional base coats are all intended for vacuum-depositing aluminum thereon. When another metal such as chromium or nickel is vacuum-deposited on such base coats, it is difficult to maintain a proper difference in ductility between the base coat layer and the deposited film and a good balance between the adhesion of the substrate to the base coat layer and the adhesion of the base coat layer to the metal film deposited. The resulting deposited film has the serious defect of developing wood grain-like cracks so that a good mirror surface cannot be obtained. In an attempt to solve this problem, various investigations about undercoats have been conducted, but none have been able to produce a satisfactory undercoat. Accordingly, shaped plastic articles having a highly anti-corrosive metal such as chromium or nickel vacuum-deposited thereon, have not yet come into practical use.

These circumstances have stimulated the development of some improved methods. These methods, however, are technically less attractive than the vacuum deposition of corrosion-resistant hard metals such as chromium or nickel, in (which a relatively soft metal such as antimony, zinc or tin (which has somewhat better corrosion resistance and does not cause grain-like cracks) is used either alone or together with aluminum, or as an alloy with aluminum to enhance the corrosion resistance. These methods provide coated articles having better corrosion resistance than aluminum but their corrosion resistance is still insufficient when compared with chromium or nickel. Thus, these methods have required further improvement.

We made extensive investigations into a metal depositing method which does not bring about the above-mentioned defects such as the occurrence of grain-like cracks by vacuum-depositing chromium or nickel having good corrosion resistance and other good physical properties, or their alloys or compounds. As a result, we found that when the base coat is formed from a composition containing a mixture of a hydroxyl-containing vinyl polymer having a specific hydroxyl number and a polyisocyanate compound in an excessive equivalent weight based on the former as a substantial film-forming component, coated articles having various superior properties such as appearance, adhesion and durability and freedom from grain-like cracks can be obtained irrespective of the type of the metal to be vacuum-deposited.

Accordingly, it is an object of this invention to provide a novel and improved method for vacuum-depositing various metals or their compounds or alloys, especially metals having superior corrosion resistance such as chromium or nickel, on the surface of a shaped substrate such as plastics, glass or ceramics.

Another object of this invention is to provide a primer coating composition which is useful for forming a film of a metal or its compound, especially nickel, chromium or their alloy having high corrosion resistance and strength, on the surface of a substrate such as plastics, glass or ceramics by a vacuum deposition process.

Still another object of this invention is to provide a shaped article of plastics, glass or ceramics having a metal or its compound, especially corrosion-resistant nickel or chromium or their alloy deposited thereon by vacuum deposition.

Other objects of this invention and its advantages will become apparent from the following detailed description.

According to this invention, there is provided a method for vacuum deposition which comprises coating on the surface of a substrate to be metallized an undercoating composition comprising a hydroxyl-containing vinyl polymer having a hydroxyl number of 20 to 200 and 1.1 to 5.0 equivalents, per equivalent of the hydroxyl group in the vinyl polymer, of a polyisocyanate as a film-forming component, curing the coating film, and depositing a metal or its compound on the undercoat in vacuum.

The characteristic feature of the method of this invention is that a coating composition containing a specific hydroxyl-containing vinyl polymer and a polyisocyanate compound in an excessive equivalent weight as a film-forming composition is used as an undercoating composition for vacuum deposition.

The hydroxyl-containing vinyl polymers used in this invention should have a hydroxyl number of 20 to 200, preferably 30 to 180, more preferably 60 to 160. When the hydroxyl number is less than 20, the adhesion of the vacuum deposited coating to the undercoat layer is reduced, and the undercoat layer is attacked by the solvent in the topcoating composition to be coated on the deposited film. Or the undercoat layer is heat-softened at the time of drying the topcoat which is likely to greatly impair the mirror surface remarkably. On the other hand, when the hydroxyl number is larger than 200, the adhesion of the deposited film to the undercoat is reduced.

Useful hydroxyl-containing vinyl polymers in this invention are polymers obtained by polymerization of at least one kind of a vinyl monomer containing at least one hydroxyl group in the molecule, or polymers obtained by copolymerization of vinyl monomers containing at least one hydroxyl group in the molecule and at least one other vinyl monomer copolymerizable therewith. Hydroxyl-containing acrylic or methacrylic polymers or copolymers of hydroxyl-containing acrylic or methacrylic monomers with other vinyl monomers copolymerizable therewith are especially preferred.

Thus, acrylic or methacrylic monomers containing at least one hydroxyl group in the molecule are preferred, and hydroxylalkyl esters of acrylic acid or methacrylic acid espressed by the following formula

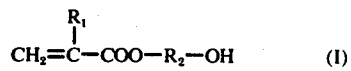

(I)

wherein $R_1$ is a hydrogen atom or methyl group, and $R_2$ is an alkylene group, preferably an alkylene group containing 1 to 5 carbon atoms, are especially preferred. Specific examples include β-hydroxyethyl acrylate, β-hydroxypropyl acrylate, γ-hydroxypropyl acrylate, β-hydroxybutyl acrylate, 4-hydroxybutyl acrylate, and β-hydroxypentyl acrylate. However, the scope of this invention is not limited in any way by the hydroxyalkyl esters. Other examples of preferred acrylic or methacrylic monomers include acrylic monoesters or methacrylic monoesters of polyhydric alcohols such as glycerol, or trimethylolpropane, and N-hydroxyalkyl derivatives of acrylamide or methacrylamide expressed by the following formula

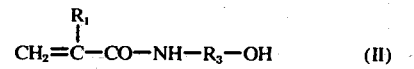

(II)

wherein $R_3$ is an alkylene group, especially an alkylene group containing 1 to 5 carbon atoms, and $R_1$ is the same as defined hereinabove, such as N-methylol acrylamide or N-methylol methacrylamide. Sometimes, other hydroxyl-containing vinyl monomers such as vinyl hydroxyacetate can be used advantageously. These vinyl monomers can be homopolymerized, or two or more of these vinyl monomers can be copolymerized. More desirably, at least one of the above hydroxyl-containing vinyl monomers is copolymerized with at least one other copolymerizable vinyl monomer.

Other vinyl monomers copolymerizable with the above hydroxyl-containing vinyl monomers are, for example, (a) acrylic or methacrylic monomers expressed by the following formula

(III)

wherein $R_4$ represents a hydrogen atom, an alkyl group preferably containing up to 18 carbon atoms, especially 1 to 5 carbon atoms, a cycloalkyl group preferably containing 5 to 8 carbon atoms, or an alkoxyalkyl group preferably containing up to 8 carbon atoms, and $R_1$ is the same as defined hereinabove, for example, acrylic and methacrylic acid, alkyl esters of acrylic acids such as methyl acrylate, ethyl acrylate, propyl acrylate, isopropyl acrylate, butyl acrylate, isobutyl acrylate, tert.-butyl acrylate, amyl acrylate, hexyl acrylate, cyclohexyl acrylate, heptyl acrylate, octyl acrylate, 2-ethylhexyl acrylate, lauryl acrylate and stearyl acrylate, and the corresponding methacrylates, and alkoxyalkyl esters of acrylic acid such as methoxyethyl acrylate and ethoxyethyl acrylate and the corresponding methacrylates; and (b) other vinyl group-containing compounds such as vinyl acetate, vinyl chloride, acrylonitrile, methacrylonitrile, acrylamide, methacrylamide, styrene, vinyltoluene, and α-methylstyrene.

Lower alkyl esters of acrylic and methacrylic acids of formula (III) in which the alkyl group contains 1 to 5 carbon atoms are especially preferred.

One or more of the above copolymerizable other vinyl monomers can be copolymerized with the hydroxy-containing vinyl monomer. In the latter case, at least one of the other vinyl monomers is desirably a lower alkyl ester of acrylic or methacrylic acid.

In order to prepare the above polymer or copolymer, solution polymerization methods known in the art of polymerizing acrylates or methacrylates can be advantageously used. The solvent to be used is preferably an organic solvent inert to isocyanate groups in order to enable the resulting polymer solution to be used directly in the method of this invention. Examples of suitable organic solvents include aromatic hydrocarbons such as benzene, toluene, ethylbenzene, or xylene, aliphatic hydrocarbons such as mineral spirit, petroleum benzin or kerosene, alicyclic hydrocarbons such as cyclohexane, halogenated hydrocarbons such as chloroform or carbon tetrachloride, ethers such as tetrahydrofuran, dimethyl ether or methyl ethyl ether, esters such as ethyl acetate, butyl acetate or ethylene glycol monoethylacetate, ketones such as acetone or methyl ethyl ketone, and nitriles such as acetonitrile.

For an easy understanding of the present invention, one example of preparing the hydroxyl-containing vinyl polymer that can be used in this invention will be described below.

2.4 parts by weight of β-hydroxymethyl methacrylate, 7.6 parts by weight of methyl methacrylate and 50 parts by weight of butyl acetate are polymerized at 80° C. for 6 hours in the presence, if desired, of a known polymerization initiator such as benzoyl peroxide, azobisisobutyronitrile or azobisisovaleronitrile. The copolymer in the resulting polymer solution has a hydroxyl number of about 20. A copolymer prepared in the same manner as above from 24 parts by weight of β-hydroxymethyl methacrylate and 26 parts of methyl methacrylate has a hydroxyl number of about 200.

The above-mentioned polymerization method is one example, and does not limit the preparation of hydroxyl-containing polymers used in this invention. Needless to say, the hydroxyl number of the resulting copolymer varies even within the above mixing ratio according to the differences in the type or molecular weight of the hydroxyl-containing vinyl monomer used. The polymerization conditions such as the polymerization temperature and time can be determined by varying the solvent and polymerization initiator used.

There is no strict restriction on the degree of polymerization of the hydroxyl-containing vinyl polymer, but it can be varied over a wide range according to various conditions such as the type of the substrate to be coated, the type of the polyisocyanate compound to be mixed, and the method of coating. Generally, the degree of polymerization is from 150 to 1,200, preferably from 300 to 900.

The degree of polymerization of any polymers used in this invention is calculated as that of polymethyl methacrylate in the following manner. First, the intrinsic viscosity $[\eta]$ of the polymer is determined from the following Baker-Sakurada equation given to polymethyl methacrylate.

$$[\eta] = \frac{3\left(\sqrt[3]{\eta_{rel}} - 1\right)}{C}$$

wherein $\eta_{rel}$ is the relative viscosity of the polymer, and C is the concentration (g/e) of the polymer solution.

The result is then applied to the Schulz equation $$\bar{p} = \frac{[\eta] - 0.0095}{0.47 \times 10^{-4}}$$

Thus, the average degree of polymerization (P) is determined.

The polyisocyanate compound that can be used in admixture with the above hydroxyl-containing polymer is a compound containing at least two isocyanate groups in the molecule. Specific examples include aliphatic or alicyclic diisocyanates such as hexamethylene diisocyanate, 2,4-diisocyanate-1-methylcyclohexane, 2,6-diisocyanate-1-methylcyclohexane, diisocyanate cyclobutane, tetramethylene diisocyanate, o-, m- and p-xylylene diisocyanate, dicyclohexylmethane diisocyanate, dimethyl dicyclohexylmethane diisocyanate and lysine diisocyanate alkyl esters with the alkyl moiety containing 1 to 6 carbon atoms; aromatic polyisocyanates such as tolylene-2,4-diisocyanate, tolylene-2,6-diisocyanate, diphenylmethane-4,4'-diisocyanate, 3-methyldiphenylmethane-4,4'-diisocyanate, m- and p-phenylene diisocyanate, chlorophenylene-2,4-diisocyanate, naphthalene-1,5-diisocyanate, diphenyl-4,4'-diisocyanate-3,3'-dmethyldiphenyl, 1,3,5-triisopropyl-benzene-2,4-diisocyanate and diphenyl ether diisocyalate; and mixtures of these. There can also be used polyurethane polyisocyanates obtained by reacting the above polyisocyanate compounds with an excess of water or a polyol such as ethylene glycol, butylene glycol, diethylene glycol, neopentyl glycol, trimethylol propane, glycerol, or hexanetriol.

Of these, an adduct of 2,4-tolylene diisocyanate and trimethylol propane expressed by the following formula

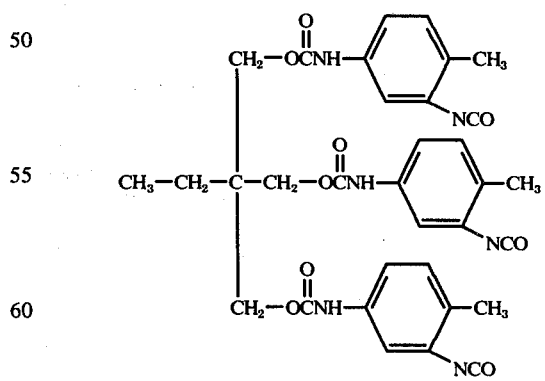

and a pentamer formed between 2,4-tolylene diisocyanate and 2,6-tolylene diisocyanate and expressed by the following formula

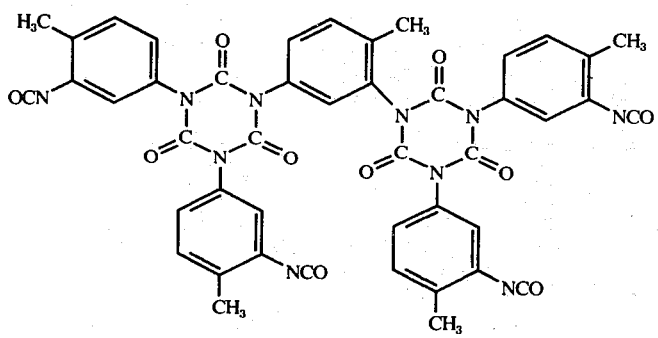

are especially preferred mainly because of their availability and ease of handling. Furthermore, a polyisocyanate of the following formula

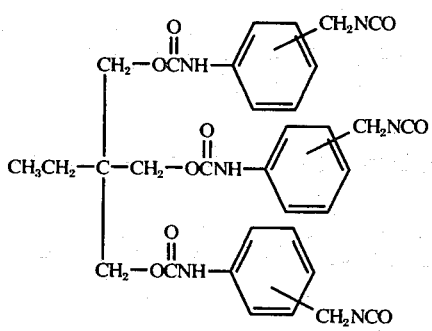

and a polyisocyanate of the following formula

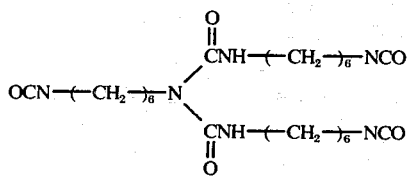

are also suitable for use in this invention.

The hydroxyl-containing vinyl polymer and the polyisocyanate compound are mixed in situ, and if desired, diluted to a suitable coating viscosity with the organic solvent inert to isocyanate groups. The resulting coating solution is applied to the surface of a substrate. It is important that the polyisocyanate compound should be mixed in an amount of 1.1 to 5.0 equivalents, preferably 1.3 to 3.0 equivalents, more preferably 1.5 to 2 equivalents, per equivalent of the hydroxyl group of the vinyl polymer. In other words, the film-forming component of the primer used in this invention is characterized by containing the polyisocyanate which is excessive in equivalent weight over the hydroxyl-containing vinyl polymer. When the amount of the polyisocyanate compound is less than 1.1 equivalents per equivalent of the hydroxyl group of the vinyl polymer, various problems arise. For example, the adhesion of the vacuum-deposited film layer to the primer coat is reduced, the primer is attacked by the solvent contained in the topcoat, or the primer coat layer is heat-softened during the drying of the topcoat thereby impairing the mirror surface considerably. On the other hand, when the amount of the polyisocyanate compound is larger than 5.0 equivalents, there is a tendency for the adhesion between the substrate and the primer coat and the adhesion between the primer coat and the vacuum-deposited film layer to deteriorate.

According to the method of this invention, the hydroxyl-containing vinyl polymer is mixed with the polyisocyanate compound prior to coating, and if desired, the mixture is diluted to a suitable coating thickness using the organic solvent inert to isocyanate groups to form a primer. The concentrations of the hydroxyl-containing vinyl polymer and the polyisocyanate compound in the primer can be adjusted generally to 10 to 50% by weight, preferably 15 to 30% by weight, based on the weight of the primer.

The primer prepared is then coated on the surface of a substrate by any known coating methods such as spray coating, dip coating, roller coating, or flow coating. The coating thickness is not critical, but can be varied over a wide range according to the type of the metal to be vacuum-deposited, the types and concentrations of the vinyl monomer and the polyisocyanate compound. For example, the coating thickness is generally 2 to 50 microns, preferably 3 to 30 microns, more preferably 5 to 15 microns.

The coated film can be dried and cured by allowing it to stand at room temperature, but generally, it is advantageous to cure it to some extent by heating. The curing time can be shortened by heating to a temperature above about 50° C. and up to a point 5° C. lower than the softening point of the substrate when the substrate has a relatively low softening temperature like a thermoplastic resin, and to a temperature of 50° to 150° C. when the substrate is a plastic article, glass or ceramic which has a relatively high softening temperature above 150° C.

The primer may contain a plasticizer such as a polyester type plasticizer or a high molecular weight plasticizer such as saccharose acetate butyrate, a pigment, a dye or other additives which are frequently used for paints in customary amounts (small amounts). If desired, cellulose derivatives such as nitrocellulose or cellulose acetate butyrate and other polymeric substances can be added as modifiers in suitable amounts.

While the conventional primers are effective only for vacuum-deposited aluminum films, the primers prepared in accordance with this invention are effective not only for aluminum films, but also for a variety of other metals or metal compounds. These primers thus have a superior advantage in that they permit the formation of excellent vacuum-deposited films of any metals free from grain-like cracks.

Metals which can be vacuum-deposited on the primer coat in accordance with this invention are, for example, elemental metals such as iron, silicon, germanium, selenium, aluminum, tin, antimony, lead, chromium, nickel, bismuth, silver, gold, platinum, palladium, copper, indium, arsenic, cadmium, tellurium, zinc, manganese, magnesium, gallium, beryllium and cobalt, mixtures of these metals, alloys consisting mainly of at least one of these metals, and compounds containing these metals, for example, their oxides. Of these, tin, antimony, chromium, nickel, copper and zinc (especially the chromium, nickel and zinc), alloys composed mainly of these metals are preferred. When these metals are vacuum-deposited, the excellent results intended by this invention are conspicuously obtained.

It should be noted that the term "metal" used in this application frequently denotes not only elemental metals but also alloys.

Examples of the substrate on which to vacuum-deposit the above-mentioned metals or metal compounds include plastics or polymeric products such as polycarbonates, polyesters, fluorine resins, acrylic resins, ABS resin, polyvinyl chloride, polysulfone, polystyrene, polyacetal, polyphenylene oxide, polyolefins (e.g., polyethylene or polypropylene), epoxy resins, or phenol resins, and glass and ceramics.

The method of this invention is especially suitable for application to shaped articles of ABS resin, polycarbonates, polyphenylene oxide, polystyrene, or polyolefins.

In the present invention, the vacuum-deposition of the above metal or metal compound on the surface of a substrate coated with the primer can be performed by any known procedure, for example, a resistance heat evaporating method, an electron beam method, a sputtering method, or an ion plating method. These vacuum-deposition methods are well known, and the operations required are obvious to those skilled in the art. Thus, these procedures will be described only briefly below.

1. Resistance heat vacuum-deposition method wire- or boat-like heat-generating source made, for example, of W or Ta which is placed in a vacuum chamber held at a vacuum on the order of $10^{-4}$ to $10^{-6}$ mmHg. An electric current is passed through the heat-generating source to heat it to a temperature of 2,500° to 2,800° C., and the melted and evaporated metal particles are condensed on the surface of a substrate place in the same vacuum chamber.

2. Electron beam method

This method differs from the method (1) only in that the heating of the metal is performed in a different manner. While in the resistance heat vacuum-deposition method, an electric current is passed through a tungsten wire or boat and the metal is melted and evaporated by the generated Joule's heat, the electron beam method involves impinging accelerated electron beams against the metal by means of an electron beam gun to change the motion energy of the electrons to heat and thus to melt and evaporate the metal, and depositing the evaporated metal on the surface of the substrate.

3. Sputtering method

In a vacuum chamber filled with an inert gas such as AR and maintained at a vacuum on the order of $10^{-2}$ to $10^{-3}$, a direct current potential of 1 to 20 KV is applied between an anode and a cathode which is composed of a metal to be deposited (target) to generate a glow discharge. By cathode sputtering, the metal particles ejected from the cathode are adhered to the surface of the substrate in a condensed form thereby to form a film of the metal.

4 Ion plating method

A substrate and an evaporating source are placed in a vacuum chamber maintained at a high vacuum on the order of about $10^{-2}$ mmHg, and the metal particles heat-evaporated at the evaporating source are ionized and given a high energy by plasma discharge of an inert gas such as Ar. The metal particles are then impinged against the surface of the substrate to form a film of the metal.

The degree of vacuum at the time of performing vacuum deposition can be varied widely depending upon the type of the metal or metal compound to be used or the method of vacuum deposition, and suitable degrees of vacuum will be obvious to those skilled in the art.

The thickness of the film of the metal or metal compound deposited on the substrate is not critical, but can be varied over a wide range according mainly to the type of the metal or metal compound or the end use of the final product. Generally, suitable thickness of the film is 150 to 5,000 A, preferably, 250 to 3,000 A, more preferably 400 to 2,000 A.

If desired, the vapor deposition may be carried out in an atmosphere of an inert gas such as argon, helium or nitrogen.

The vacuum-deposited film of the metal or metal compound so prepared adheres firmly to the substrate through the primer coat and gives an excellent mirror surface free from grain-like cracks and has high thermal stability. For some uses, it can be used directly without further treatment. Generally, a topcoat is applied to the vacuum-deposited film in order to protect it.

The topcoat paints can be selected from many known species according to the end use of the resulting product. For example, there can be advantageously used a polyurethane-type paint comprising a combination of an acrylic-type polyol and a non-yellowing polyisocyanate compound and an acrylic paint comprising an acrylic polymer such as a polymer of methyl methacrylate or n-butyl methacrylate as a film-forming component.

The coating thickness of the topcoat is neither critical, but can be varied according mainly to the end use of the resulting product. Generally, coating thicknesses of 2 to 50 microns, preferably 5 to 20 microns are sufficient.

The method of this invention makes it possible to vacuum-deposit metals such as chromium, nickel or zinc, especially highly anti-corrosive metals, by using primer compositions having the above-specified constituent proportions, and thus broadens the area in which vacuum-deposited products can be used.

The products provided by this invention are such that the film of the metal or metal compound adheres firmly to the surface of a substrate such as plastics, glass or ceramics through a coating of the hydroxyl-containing vinyl polymer which is cured to a three-dimensional cross-linked structure by the excess polyisocyanate specified hereinabove. In addition, no grain-like crack occurs in the vacuum-deposited metal or metal compound.

The following Examples further illustrate the present invention. All parts given in the following Examples and Example of Preparing Hydroxy-Containing Polymers are by weight.

EXAMPLE OF PREPARING HYDROXYL-CONTAINING POLYMERS

Copolymers with varying hydroxyl numbers were prepared in accordance with the recipes shown in Table 1 below for use in combination with polyisocyanate compounds in the following Examples. The individual ingredients shown in Table 1 were charged into a polymerization vessel equipped with a stirrer, condenser and thermometer, and polymerized at 80° C. for 6 hours to form solutions of polymers having the hydroxyl numbers and degrees of polymerization shown in Table 1.

In the preparation of the polymer solutions D and I, the ploymerization was performed in an atmosphere of nitrogen. In the preparation of the polymer solution D, the polymerization vessel further included a reflux condenser capable of cooling to −20° to −30° C.

The resulting coating solution was allowed to stand at room temperature for about 1 hour, and spray-coated onto an ABS resin plate to a dry thickness of about 10 microns. After 10 minutes' standing for reflow, the coating was dried and cured at 80° C. for 60 minutes.

Then, using a resistance heating-type vacuum evaporator for different kinds of metal (a product of Nippon Shinku Gijyutsu Sha), an alloy composed of Ni, Cr, Cu and Fe in a ratio of 50:30:10:10 was heated for 2 minutes on a tungsten boat placed in a vacuum evaporating kettle maintained at a vacuum of $1 \times 10^{-5}$ mmHg to deposit the the alloy on the surface of the ABS resin plate to a coating thickness of 800 to 1,000 A. A top-coating composition consisting of an acrylic resin and cellulose acetate butyrate (VMT-36, trademark for a product of Fujikura Kasei Co., Lrd.) was applied to the metal film to a dry thickness of 5 microns, and dried at 65° C. for 30 minutes to form a vacuum-deposited Table 1

| Recipes | Polymer solution A | B | C | D | E | F | G | H | I | J | K | L | M |
|---|---|---|---|---|---|---|---|---|---|---|---|---|---|
| Methyl methacrylate | | 25 | | | | 26 | 26 | 20 | | 17 | | 28.5 | 7 |
| n-Butyl methacrylate | | 10 | | | | | | 12 | | | | | |
| t-Butyl methacrylate | | | 30 | | | | | | | | | | |
| Methyl acrylate | 26.2 | | | | | | | | | | | | |
| Ethyl acrylate | | | 12.3 | 20 | | 19 | 19 | | | 11.5 | 20 | | 12 |
| n-Butyl acrylate | | 10 | | | | | | 3 | | | | 20 | |
| Propyl acrylate | | | | | 20 | | | | 30 | | | | |
| Vinyl acetate | | | | | 21 | | | | | | | | |
| Vinyl chloride | | | | 5 | | | | | | | | | |
| Acrylonitrile | 20 | | | | | | | | | | | | |
| Styrene | | | | 10 | | | | | | | 10 | | |
| Vinyltoluene | | | | 5 | | | | | 6.5 | | | | |
| β-Hydroxymethyl methacrylate | | | | | | 15 | | | | | | | 31 |
| 4-Hydroxybutyl acrylate | 3.8 | | 7.7 | | | | | | | | | | |
| β-Hydroxypropyl acrylate | | 5 | | | | | 15 | 15 | | 21.5 | | 1.5 | |
| N-methylol acrylamide | | | | | 9 | | | | 13.5 | | | | |
| Ethylene glycol monomethacrylate | | | | 10 | | | | | | | 20 | | |
| Butyl acetate | | | | | | 50 | 50 | | | | | | 50 |
| Isobutyl acetate | 50 | 50 | 50 | 50 | 50 | | | 50 | 50 | 50 | 50 | 50 | |
| Benzoyl peroxide | | 2.0 | 2.0 | | | 2.0 | 2.0 | 2.0 | 2.0 | | | 2.0 | 2.0 |
| Azobisisobutyro-nitrile | 2.0 | | | 2.0 | 2.0 | | | | | 2.0 | | | |
| Hydroxyl number of the copolymer | 30 | 40 | 60 | 90 | 100 | | 120 | | 150 | | 180 | 10 | 260 |
| Degree of polymerization of the copolymer | 450 | 520 | 600 | 850 | 780 | 750 | 550 | 580 | 650 | 430 | 600 | 520 | 590 |

EXAMPLE 1

A primer coating solution containing tolylene diisocyanate with 1.5 equivalents of isocyanate groups per equivalent of the hydroxyl group of the polymer was prepared from the following formulation.

| Formulation | |
|---|---|
| Polymer solution F | 100 parts |
| Desmodur L-75 (a trademark for tolylene diisocyanate, a product of Bayer AG) | 52 |
| Toluene | 43 |
| Xylene | 50 |
| Shell Sol A (trademark for an aromatic hydrocarbon solvent, a product of Shell Chemical Co.) | 70 |
| Super Sol SS-1500 (trademark for an aromatic hydrocarbon solvent, a product of Mitsubishi Petroleum Co., Ltd.) | 60 |
| Butyl triacetate | 50 |
| Cyclohexanone | 20 | product. The products obtained were tested by the following methods, and the results are shown in Table 2.

1. Adhesion (crosscut test)

Eleven crosscuts with a width of 1 mm are provided both longitudinally and transversely on the surface of the sample, and an adhesive tape is applied to the cut surface. The tape is then peeled off to determine the number of crosscuts remaining after peeling. When there is no peeling and the adhesion is good, the result is evaluated as 100, and when the film is completely peeled off and the adhesion is poor, the result is evaluated as 0.

2. Crack

The presence or absence of cracks formed on the vacuum-deposited film is examined visually.

3. Thermal stability

The sample is heated at 60° C. for 1 hour, and then, the presence or absence of cracks on the vacuum-deposited film is examined visually.

EXAMPLE 2

A primer coating solution was prepared from the following formulation in the same way as in Example 1.

| Formulation | |
|---|---|
| Polymer solution G | 100 parts |
| Desmodure L-75 | 104 |
| Toluene | 48 |
| Xylene | 50 |
| Shell Sol A | 70 |
| Super Sol SS-1500 | 60 |
| Butyl triacetate | 50 |
| Cyclohexanone | 30 |

A vacuum-deposited product was prepared using the primer coating solution obtained above, and tested in the same way as in Example 1. The results are shown in Table 2.

EXAMPLE 3

A primer coating solution was prepared from the following formulation in the same way as in Example 1.

| Formulation | |
|---|---|
| Polymer solution H | 100 parts |
| Desmodure N-75 (trademark for hexamethylene diisocyanate, a product of Bayer AG) | 109 |
| Toluene | 59 |
| Xylene | 60 |
| Shell Sol A | 70 |
| Super Sol SS-1500 | 50 |
| Butyl triacetate | 50 |
| Cyclohexanone | 30 |

The resulting coating solution was allowed to stand at room temperature for about 1 hour, and then spray-coated onto a polyphenylene oxide resin plate (SE-1, a product of General Electric Company) to a dry coating thickness of about 10 microns, and after 10 minutes' standing for reflow, dried and cured at 80° C. for 60 minutes.

Usng an electron beam vacuum evaporator (KRG-35, a product of Nippon Shinku Gijyutsu Sha), an alloy of the same composition as used in Example 1 was irradiated for 3 minutes by an electron beam gun with a power of 10 KW in a vacuum evaporating kettle kept at a vacuum of $3 \times 10^{-5}$ mmHg deposit the metal film to a thickness of 1,000 A. The same topcoat as used in Example 1 was applied to the vacuum-deposited film, and dried in the same manner as in Example 1 to form a vacuum-deposited product. The resulting product was tested in the same way as in Example 1. The results are shown in Table 2.

EXAMPLES 4 and 5

A primer coating solution was prepared from the following formulation in the same way as in Example 1.

| Formulation | Example 4 | Example 5 |
|---|---|---|
| Polymer solution B | 100 parts | — |
| Polymer solution J | — | 100 parts |
| Desmodure L-75 | 35 | 155 |
| Toluene | 40 | 45 |
| Xylene | 55 | 82 |
| Shell Sol A | 60 | 120 |
| Supersol SS-1500 | 40 | 41 |
| Butyl triacetate | 40 | 80 |
| Cyclohexanone | 10 | 41 |

Using the resulting coating solution, a vacuum-deposited product was prepared in the same way as in Example 1, and tested in the same way as in Example 1. The results are shown in Table 2.

EXAMPLE 6

A primer coating solution was prepared from the following formulation in the same way as in Example 1.

| Formulation | |
|---|---|
| Polymer solution A | 100 parts |
| Desmodure IL (trademark for tolylene diisocyanate, a product of Bayer AG) | 28 |
| Toluene | 52 |
| Xylene | 78 |
| Shell Sol A | 26 |
| Butyl triacetate | 52 |
| Cyclohexanone | 52 |

The resulting coating solution was coated on a polycarbonate resin plate (Iupilon S-2000, a product of Mitsubishi Gas Chemical Co., Ltd.) and cured in the same way as in Example 1. Then, an alloy consisting of Ni and Cr in a ratio of 8:2 was vacuum-deposited on the resin plate and tested in the same way as in Example 1. The results are shown in Table 2.

EXAMPLE 7

A primer coating solution was prepared from the following formulation in the same was as in Example 1.

| Formulation | |
|---|---|
| Polymer solution C | 100 parts |
| Desmodure L-75 | 69 |
| Toluene | 86 |
| Xylene | 128 |
| Shell Sol A | 43 |
| Butyl triacetate | 85 |
| Cyclohexanone | 86 |

A polypropylene sheet (M.P.C. Polypro J-430, trademark for a product of Mitsui Petrochemical Co., Ltd.) was immersed at 60° C. for 5 minutes in a mixture consisting of 50 parts of sulfuric acid, 30 parts of dichromic acid and 20 parts of water, washed with water and dried. The above primer coating solution was coated on the polypropylene sheet so treated in the same way as in Example 1. Then, a vacuum-deposited product was prepared in the same way as in Example 6. The product was tested in the same way as in Example 1. The results are shown in Table 2.

EXAMPLE 8

A primer coating solution was prepared from the following formulation in the same way as in Example 1.

| Formulation | |
|---|---|
| Polymer solution E | 100 parts |
| Desmodure N-75 | 68 |
| Toluene | 74 |
| Xylene | 112 |
| Shell Sol A | 38 |
| Butyl triacetate | 74 |
| Cyclohexanone | 74 |

The resulting primer coating solution was coated, and dried and cured in the same way as in Example 1, and then an alloy composed of Ni and Cr in a ratio of 7:3 was vacuum-deposited to a thickness of 2,000 A by sputtering for 10 minutes at a deposition rate of 150 to 200 A per minute at 13.56 MHz and 1 KW using a sputtering device (SBR-5100, a product of Nippon Shinku Gijyutsu Sha). The same topcoat as in Example 1 was formed thereon, and dried in the same way as in Example 1. The resulting product was tested in the same way as in Example 1. The results are shown in Table 2.

EXAMPLE 9

A primer coating solution was prepared from the following formulation in the same way as in Example 1.

| Formulation | |
|---|---|
| Polymer solution I | 100 parts |
| Desmodure IL | 246 |
| Toluene | 145 |
| Xylene | 217 |
| Shell Sol A | 72 |
| Butyl triacetate | 145 |
| Cyclohexanone | 145 |

The procedure as in Example 1 was repeated to produce a vacuum-deposited product except that the above primer coating solution and a 5:5 Ni-Cr alloy were used. The test result are shown in Table 2.

EXAMPLE 10

A primer coating solution was prepared from the following formulation in the same way as in Example 1.

| Formulation | |
|---|---|
| Polymer solution K | 100 parts |
| LDI-100 (trademark for lysine diisocyanate, a product of Kyowa Hakko Kogyo Sha) | 176 |
| Toluene | 98 |
| Xylene | 146 |
| Shell Sol A | 49 |
| Butyl triacetate | 98 |
| Cyclohexanone | 97 |

The resulting coating solution was coated on a polystyrene plate (777-50, a product of Asahi Dow) and dried and cured in the same way as in Example 1. The same alloy used in Example 6 was ion-plated for 1 minute on the polystyrene plate by a 5 KW electron beam gun and 7.5 KV DC voltage using an ion plating device (DRP-5E, a product of Nippon Shinku Gijyutsu Sha) to form a deposited film having a thickness of 1000 A. The same topcoat as in Example 1 was coated on the vacuum-deposited film. The resulting product was tested in the same way as in Example 1. The test results are shown in Table 2.

EXAMPLE 11

In the same way as in Example 1, a primer coating solution was prepared from the following formulation.

| Formulation | |
|---|---|
| Polymer solution D | 100 parts |
| Desmodure L-75 | 65 |
| Toluene | 82 |
| Xylene | 124 |
| Shell Sol A | 41 |
| Butyl triacetate | 82 |
| Cyclohexanone | 83 |

The resulting primer coating solution was coated on the same ABS resin plate as used in Example 1, and dried and cured in the same way as in Example 1. Then, an Ni-Cr alloy was vacuum-deposited using the same electron beam vacuum evaporator as used in Example 3 in the same way as in Example 3. Then, a topcoating solution of the urethane type consisting of the above polymer solution F and Desmodure N-75 (the NCO-/OH equivalent ratio of 1/1) (MT-37, a product of Fujikura Kasei Co., Ltd.) was spray-coated on the vacuum-deposited film to a dry coating thickness of 5 microns. The coating was dried and cured at 65° C. for 60 minutes. The product was tested in the same way as in Example 1. The test results are shown in Table 2.

EXAMPLE 12

The procedure of Example 2 was repeated except that elemental nickel was used instead of the alloy used in Example 2. The results are shown in Table 2.

EXAMPLE 13

The procedure of Example 2 was repeated except that elemental chromium was used instead of the alloy used in Example 2. The results are shown in Table 2.

EXAMPLE 14

The procedure of Example 2 was repeated except that a 8:2 Ni-Cr alloy was used instead of the alloy used in Example 2. The results are shown in Table 2.

EXAMPLE 15

The procedure of Example 2 was repeated except that aluminum was used instead of the alloy used in Example 2. The results are shown in Table 2.

COMPARATIVE EXAMPLES 1 to 2

In the same way as in Example 1, primer coating solutions were prepared from the following formulations. The equivalent weight of the polyisocyanate group to be mixed with the hydroxyl-containing vinyl polymer was outside the scope of this invention.

| Formulations | Comparative Examples | |
|---|---|---|
| | 1 | 2 |
| Polymer solution G | 100 parts | 100 parts |
| Desmodure L-75 | 28 | 207 |
| Toluene | 37 | 62 |
| Xylene | 40 | 122 |
| Shell Sol A | 60 | 183 |
| Supersol SS-1500 | 40 | 62 |
| Butyl triacetate | 40 | 124 |

-continued

| Formulations | Comparative Examples | |
|---|---|---|
| | 1 | 2 |
| Cyclohexanone | 10 | 62 |

Vacuum-deposited products were prepared in the same way as in Example 1 using the above primer coating solutions. The test results are shown in Table 2.

COMPARATIVE EXAMPLES 3 and 4

Primer coating solutions were prepared from the following formulations using hydroxyl-containing polymers having a hydroxyl number outside the scope of this invention.

| Formulations | Comparative Examples | |
|---|---|---|
| | 3 | 4 |
| Polymer solution L | 100 parts | — |
| Polymer solution M | — | 100 parts |
| Desmodure L-75 | 9 | — |
| Desmodure N-75 | — | 88 |
| Toluene | 29 | 58 |
| Xylene | 58 | 116 |
| Shell Sol A | 84 | 174 |
| Supersol SS-1500 | 29 | 58 |
| Butyl triacetate | 56 | 116 |

-continued

| Formulations | Comparative Examples | |
|---|---|---|
| | 3 | 4 |
| Cyclohexanone | 29 | 58 |

Vacuum-deposited products were prepared in the same way as in Example 1 using the resulting primer coating solutions. The test results are shown in Table 2.

COMPARATIVE EXAMPLE 5

An Ni-Cr alloy was vacuum-deposited in the same way as in Example 1 on a primer coat for vacuum deposition which consisted of commercially available urethanized oil (a product of Japan Reichold Co.) and nitrocellulose heretofore commercially available for vacuum deposition of aluminum. The same topcoat as in Example 1 was applied to the surface of the vacuum-deposited film. The resulting product was tested in the same way as in Example 1. The test results are shown in Table 2.

Table 2

| | | Examples | | | | | | | | | | | | | | |
|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 |
| Copolymer solutions | | F | G | H | B | J | A | C | E | I | K | D | G | G | G | G |
| Hydroxyl number of the copolymer | | 120 | 120 | 120 | 40 | 180 | 30 | 60 | 100 | 150 | 180 | 90 | 120 | 120 | 120 | 120 |
| Isocyanate compound (*1) | | L-75 | L-75 | N-75 | L-75 | L-75 | IL | L-75 | N-75 | IL | LDI | L-75 | L-75 | L-75 | L-75 | L-75 |
| NCO/OH equivalent ratio of the primer coating solution | | 1.5 | 3.0 | 4.0 | 3.0 | 3.0 | 2.0 | 4.0 | 3.0 | 3.5 | 3.0 | 2.5 | 3.0 | 3.0 | 3.0 | 3.0 |
| Substrate (*2) | | ABS | ABS | PPO | ABS | ABS | PC | PP | ABS | ABS | PS | ABS | ABS | ABS | ABS | ABS |
| Method of vacuum deposition (*3) | | RH | RH | EB | RH | RH | RH | RH | SP | RH | IP | EB | RH | RH | RH | RH |
| Metal vacuum deposited | | Ni 5 Cr 3 Cu 1 Fe 1 | " | " | " | " | Ni 8 Cr 2 | Ni 8 Cr 2 | Ni 7 Cr 3 | Ni 5 Cr 5 | Ni 8 Cr 2 | Ni 8 Cr 2 | Ni | Cr | Ni 9 Cr 1 | Al |
| Test items | Adhesion (crosscut test) | 100 | 95 | 90 | 90 | 95 | 100 | 90 | 100 | 95 | 100 | 100 | 100 | 100 | 100 | 95 |
| | Cracks | No | No | No | No | No | No | No | No | No | No | No | No | No | No | No |
| | Thermal stability test (cracks) | No | No | No | No | No | No | No | No | No | No | No | No | No | No | No |

| | | Comparative Examples | | | | |
|---|---|---|---|---|---|---|
| | | 1 | 2 | 3 | 4 | 5 |
| Copolymer solutions | | G | G | L | M | Conventional primer for Al deposition |
| Hydroxyl number of the copolymer | | 120 | 120 | 10 | 260 | |
| Isocyanate compound (*1) | | L-75 | L-75 | L-75 | N-75 | |
| NCO/OH equivalent ratio of the primer coating solution | | 0.8 | 6.0 | 3.0 | 3.0 | |
| Substrate (*2) | | ABS | ABS | ABS | ABS | ABS |
| Method of vacuum deposition (*3) | | RH | RH | RH | RH | RH |
| Metal vacuum deposited | | Ni 5 Cr 3 Cu 1 Fe 1 | Ni 5 Cr 3 Cu 1 Fe 1 | Ni 5 Cr 3 Cu 1 Fe 1 | Ni 5 Cr 3 Cu 1 Fe 1 | Ni 8 Cr 2 |
| Test items | Adhesion (crosscut test) | 100 | 10 | 90 | 15 | 100 |
| | Cracks | Yes | No | Yes | No | Yes |
| | Thermal stability test (cracks) | — | No | — | No | — |

What we claim is:

1. A method for vacuum deposition which comprises coating on the surface of a substrate to be metallized an undercoating composition comprising a hydroxy-containing vinyl polymer having a hydroxyl number of 20 to 200 and 1.1 to 5.0 equivalents, per equivalent of the hydroxyl group in the vinyl polymer, of a polyisocyanate as a filmforming component, curing the coated film, and depositing a metal or its compound on the undercoat in vacuum to form a metallic layer on said undercoat.

2. The method of claim 1 wherein said hydroxyl-containing vinyl polymer has a hydroxyl number of 30 to 180.

3. The method of claim 1 wherein said hydroxyl-containing vinyl polymer is a hydroxyl-containing acrylic or methacrylic polymer.

4. The method of claim 3 wherein said hydroxyl-containing acrylic or methacrylic polymer is a copolymer of a hydroxyl-containing acrylic or methacrylic monomer and another vinyl monomer copolymerizable therewith.

5. The method of claim 4 wherein said hydroxyl-containing acrylic or methacrylic monomer is a compound expressed by the following formula

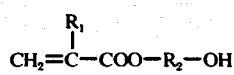

$$CH_2=\underset{\underset{R_1}{|}}{C}-COO-R_2-OH$$

wherein $R_1$ is a hydrogen atom or a methyl group, and $R_2$ is an alkylene group containing 1 to 5 carbon atoms.

6. The method of claim 4 wherein said other vinyl monomer container a member selected from the group consisting of acrylic acid esters and methacrylic acid esters.

7. The method of claim 1 wherein said hydroxyl-containing vinyl polymer has a degree of polymerization of 150 to 1,200.

8. The method of claim 1 wherein said polyisocyanate is used in a proportion of 1.3 to 3.0 equivalents per equivalent of the hydroxyl group of said hydroxyl-containing vinyl polymer.

9. The method of claim 1 wherein said polyisocyanate is an aromatic polyisocyanate.

10. The method of claim 9 wherein said aromatic polyisocyanate is an adduct of 2,4-tolylene diisocyanate and trimethylol propane or a pentamer of 2,4-tolylene diisocyanate and 2,6-tolylene diisocyanate.

11. The method of claim 1 wherein said undercoat has a thickness of 2 to 50 microns.

12. The method of claim 1 wherein said substrate to be metallized is an ABS resin, polycarbonate, polystyrene, polyolefin or polyphenylene oxide.

13. The method of claim 1 wherein said metal or metal compound is selected from the group consisting of tin, antimony, chromium, nickel, cooper and zinc, alloys composed mainly of at least one of said metals and oxides of these metals.

14. The method of claim 1 wherein the vacuum deposition of said metal or metal compound is performed by a resistance heat evaporation method, electron beam method, sputtering method or ion plating method.

15. The method of claim 1 wherein said vacuum deposition is performed at a vacuum of $10^{-2}$ to $10^{-6}$ mmHg.

16. The method of claim 1 wherein said metal or metal compound is vacuum-deposited to a thickness of 150 to 5,000 A.

17. The method of claim 1 wherein a topcoat is applied onto the metallic layer deposited on said undercoating.

18. The method of claim 17 wherein said topcoating composition is a polyurethane-type paint or acrylic paint.

* * * * *